(12) United States Patent
Gill

(10) Patent No.: US 6,501,626 B1
(45) Date of Patent: Dec. 31, 2002

(54) READ HEAD WITH A COMBINED SECOND READ GAP AND PINNING LAYER FOR A TOP SPIN VALVE SENSOR

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,225

(22) Filed: May 3, 2000

(51) Int. Cl.$^7$ ................................................. G11B 5/39
(52) U.S. Cl. .................................................. 360/324.11
(58) Field of Search .............................. 360/324.11, 314, 360/315, 317, 320, 324, 324.1, 324.12, 113, 126

(56) References Cited

U.S. PATENT DOCUMENTS

| | | | |
|---|---|---|---|
| 4,901,179 A | * 2/1990 | Satomi et al. | 360/120 |
| 5,492,720 A | 2/1996 | Gill et al. | 427/131 |
| 5,568,335 A | 10/1996 | Fontana et al. | 360/113 |
| 5,668,685 A | 9/1997 | Soeya et al. | 360/113 |
| 5,675,459 A | 10/1997 | Sato et al. | 360/113 |
| 6,154,349 A | * 11/2000 | Kanai et al. | 360/324.11 |
| 6,262,869 B1 | * 7/2001 | Lin et al. | 360/324.11 |
| 6,307,722 B1 | * 10/2001 | Sato et al. | 360/324.12 |

FOREIGN PATENT DOCUMENTS

| | | |
|---|---|---|
| JP | 5-266437 | 10/1993 |
| JP | 6-052517 | 2/1994 |
| JP | 8-194922 | 7/1996 |
| JP | 9-198619 | 7/1997 |

* cited by examiner

Primary Examiner—David Hudspeth
Assistant Examiner—Angel Castro
(74) Attorney, Agent, or Firm—Ervin F. Johnston

(57) ABSTRACT

A read head is provided with a combined second read gap and pinning layer which pins a pinned layer structure of a top spin valve sensor. The second read gap layer is at least partially composed of alpha ferric oxide ($\alpha Fe_2O_3$) which pins the pinned layer by coercivity. The second read gap layer defines the track width of the read head and its alpha ferric oxide ($\alpha Fe_2O_3$) composition provides specular reflection of conduction electrons in the spin valve sensor.

82 Claims, 6 Drawing Sheets

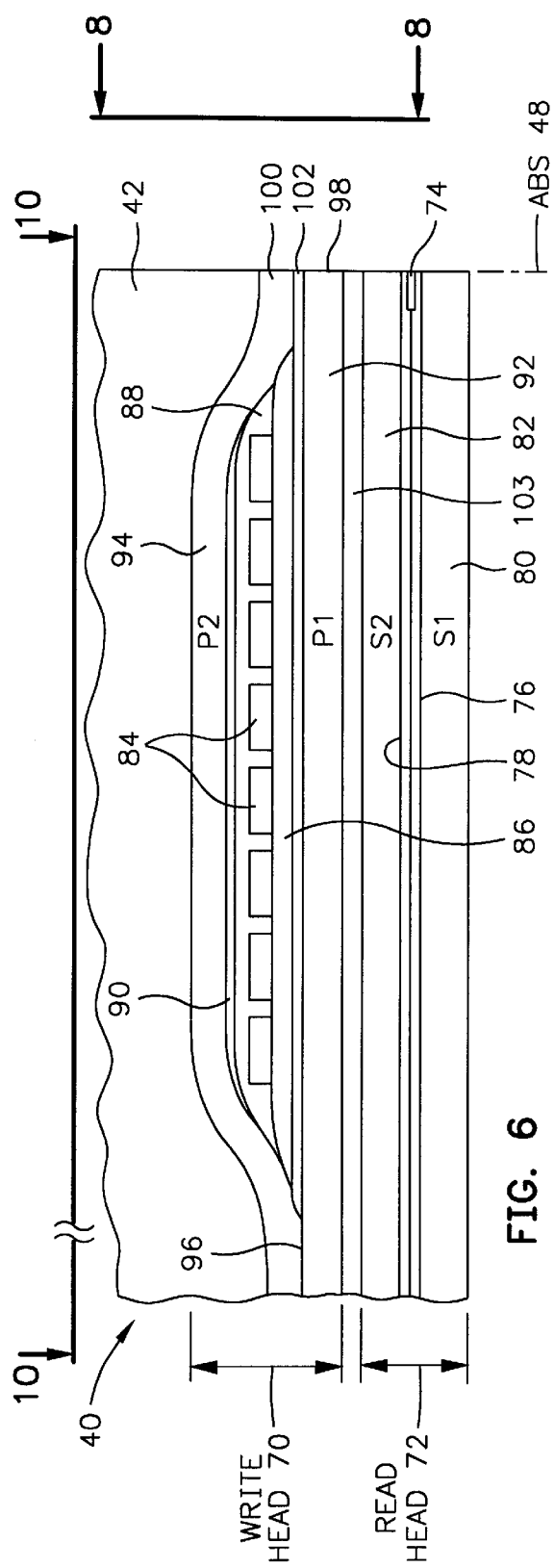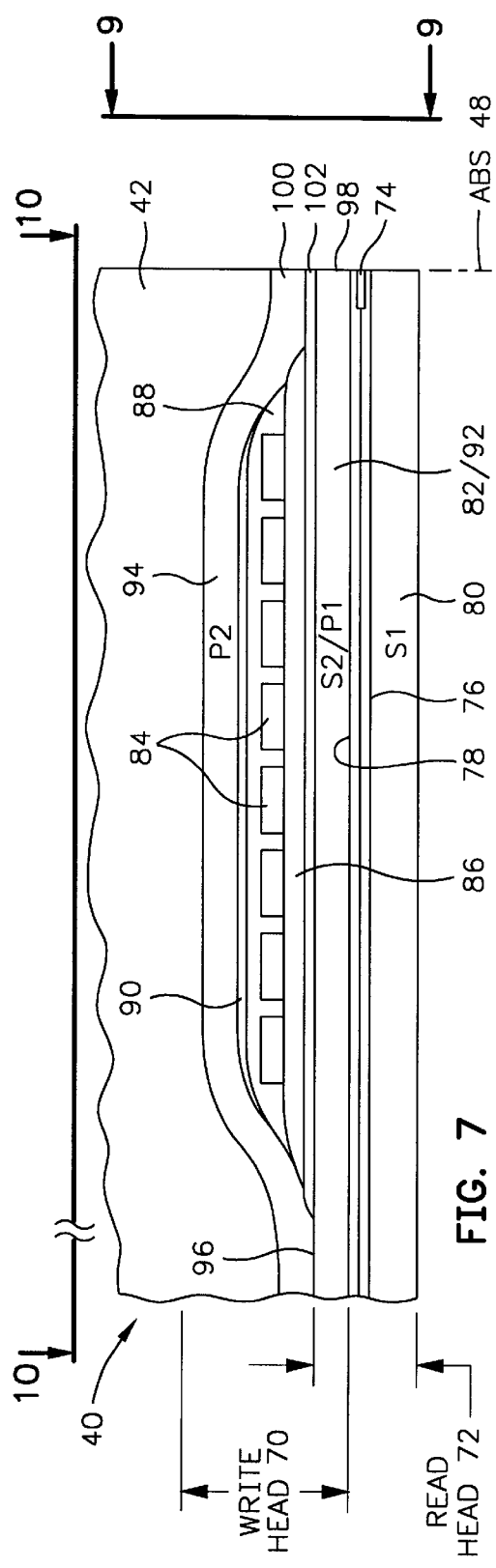
FIG. 6
FIG. 7

READ HEAD WITH A COMBINED SECOND READ GAP AND PINNING LAYER FOR A TOP SPIN VALVE SENSOR

BACKGROUND OF THE INVENTION

1. Field of the Invention

The present invention relates to a read head with a combined second read gap and pinning layer for a spin valve sensor and, more particularly, to a second read gap layer that pins a magnetic moment of a pinned layer structure in the spin valve sensor.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinning layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. When a sense current is conducted through the spin valve sensor, resistance changes cause potential changes that are detected and processed as playback signals from the rotating magnetic disk. The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. The transfer curve for a spin valve sensor is defined by the aforementioned cos θ where θ is the angle between the directions of the magnetic moments of the free and pinned layers. Because of the high magnetoresistance of a spin valve sensor it is sometimes referred to as a giant magnetoresistive (GMR) sensor.

An improved spin valve sensor, which is referred to hereinafter as antiparallel pinned (AP) spin valve sensor, is described in commonly assigned U.S. Pat. No. 5,465,185 to Heim and Parkin which is incorporated by reference herein. The AP pinned spin valve differs from a single pinned layer spin valve sensor in that the pinned layer comprises multiple layers, hereinafter referred to as an AP pinned layer structure. The AP pinned layer structure has a nonmagnetic spacer layer which is sandwiched between ferromagnetic first and second AP pinned layers. The first AP pinned layer, which may comprise several thin films, is immediately adjacent to the antiferromagnetic pinning layer and is exchange-coupled thereto, with its magnetic moment directed in a first direction. The second AP pinned layer is immediately adjacent to the spacer layer and is exchange-coupled to the first AP pinned layer by the minimal thickness (in the order of 6 Å) of the spacer layer between the first and second AP pinned layers. The magnetic moment of the second AP pinned layer is oriented in a second direction that is antiparallel to the direction of the magnetic moment of the first AP pinned layer. The magnetic moments of the first and second AP pinned layers subtractively combine to provide a net moment of the AP pinned layer structure. The direction of the net moment is determined by the thicker of the first and second AP pinned layers. The thicknesses of the first and second AP pinned layers are chosen so that the net moment is small. A small net moment equates to a small demagnetizing (demag) field exerted on the free layer by the AP pinned layer structure. Since the antiferromagnetic exchange coupling is inversely proportional to the net moment, this results in a large exchange coupling between the pinning and AP pinned layers.

A spin valve sensor can be classified as either a top spin valve sensor or a bottom spin valve sensor. In a top spin valve sensor the pinned layer structure is located closer to the second read gap layer than to the first read gap layer, and in a bottom spin valve sensor the pinned layer structure is located closer to the first read gap layer than to the second read gap layer. A spin valve sensor can be further classified as a single spin valve sensor or a dual spin valve sensor. In a dual spin valve sensor the free layer structure is located between first and second copper (Cu) spacer layers, the first and second spacer layers are located between first and second pinned layer structures and the first and second pinned layer structures are pinned by first and second pinning layers. As indicated hereinabove, a spin valve sensor can be further classified as a single pinned layer spin valve sensor or an AP pinned spin valve sensor.

The storage capacity of a computer depends upon the areal density of each of the read and write heads. The areal density of the read head is a product of its linear read density and its track width density. The track width density is quantified as the number of tracks per inch along the radius of a rotating magnetic disk. The linear density of the read head is quantified as the number of bits that can be read by the read head per inch of a track width along a circular track on the magnetic disk. The linear density of the read head depends upon the total read gap which is measured between the first and second shield layers of the read head. Accordingly, in order to increase the linear density of the read head the thicknesses of the layers of the spin valve sensor and the first and second read gap layers should be minimized. A major contributor to low linear density is the thicknesses of the first and second read gap layers. The first and second read gap layers, which are typically aluminum oxide ($Al_2O_3$), must be thick enough to prevent electrical shorting between the spin valve sensor to the first shield layer and between the first and second leads to the second shield layer. When either of these read layers become too thin there is a risk of pin holes which will permit current to short between the sensor and/or the leads to the shield layers. There is less risk of shorting between the sensor and the first shield layer since these layers are planarized. However, the first and second lead layers have steps which must be covered by the second read gap layer. The highest risk of shorting is where the second read gap layer covers the steps of the first and second lead layers since there is typically a thinning of the second read gap layer at the step locations. Accordingly, the second read gap layer is typically thicker than the first read gap layer in order to provide for adequate coverage of the steps of the first and second lead layers.

In order to increase the storage capacity of a computer there is a strong-felt need to decrease the thicknesses of the first and second read gap layers. As discussed hereinabove, however, this is restricted by the risk of shorts between the sensor and the lead layers to the shield layers.

SUMMARY OF THE INVENTION

The present invention provides a read head with a combined second read gap and pinning layer for pinning a pinned layer structure of a top spin valve sensor so as to significantly increase the linear read density of the read head. This is accomplished by providing a second read gap layer that is at least partially composed of alpha ferric oxide ($\alpha Fe_2O_3$). The alpha ferric oxide ($\alpha Fe_2O_3$) is an insulative material which serves as a second read gap between the spin valve sensor and the second shield layer. Further, the alpha ferric oxide ($\alpha Fe_2O_3$) pins the pinned layer structure by providing the pinned layer structure with high coercivity. Accordingly, the net magnetic moment of the pinned layer structure can be pinned perpendicular to the ABS in a direction either into the sensor or out of the sensor as desired. An applied magnetic field is employed for setting the magnetic moment in the desired direction.

In one embodiment of the invention the second read gap layer may be made entirely of alpha ferric oxide ($\alpha Fe_2O_3$) and in a second embodiment of the invention the second read gap layer may be made of first and second films wherein the first film is composed of alpha ferric oxide ($\alpha Fe_2O_3$) and interfaces the pinned layer structure. In the second embodiment the second film can be also composed of alpha ferric oxide ($\alpha Fe_2O_3$) or of aluminum oxide ($Al_2O_3$). With the present invention the second read gap layer can be made thick enough to cover the aforementioned steps caused by the first and second lead layers without unduly reducing the linear read density of the read head. With the present invention a separate antiferromagnetic (AFM) pinning layer is not required since the second read gap layer performs that function. By eliminating the separate pinning layer, which can be several hundred angstroms thick, the total read gap between the first and second shield layers is reduced by that amount.

In a preferred embodiment longitudinal biasing of the free layer structure in order to stabilize its magnetic domains is accomplished by first and second antiferromagnetic layers located in first and second passive regions of the read head, respectively, in lieu of first and second hard bias layers which typically abut first and second side edges of the sensor. With this arrangement the magnetic spins of the first and second antiferromagnetic biasing layers may be set by a longitudinal applied field in the presence of a high temperature such as 375° C. for platinum manganese (PtMn). Subsequently, the coercivity of the pinned layer structure can be uniaxially set perpendicular to the ABS by applying a high magnetic field without the presence of heat. Since heat is not required in the setting of the pinned layer structure the magnetic spins of the first and second antiferromagnetic biasing layers will not be altered.

An unexpected advantage of the present invention is that the alpha ferric oxide ($\alpha Fe_2O_3$) of the second read gap layer serves as a specular reflector for reflecting conduction electrons back into the mean free path of conduction electrons between the free layer structure and the pinned layer structure. Accordingly, as conduction electrons attempt to escape the mean free path they are reflected back to the mean free path for improving the magnetoresistive coefficient dr/R of the read head.

An object of the present invention is to provide a read head with a second read gap layer which pins a pinned layer structure of a top spin valve sensor.

A further object is to provide a read head with a combined second read gap and pinning layer for a top spin valve sensor which permits a significant increase in the linear read density of the read head.

A still further object is to provide a read head with a combined second read gap and pinning layer which increases the linear read density of the read head and reflects conduction electrons in a spin valve sensor for improving the magnetoresistive coefficient dr/R.

Other objects and advantages of the invention will become apparent upon reading the following description taken together with the accompanying drawings.

DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DETAILED DESCRIPTION OF THE PREFERRED EMBODIMENTS

Magnetic Disk Drive

Figure 1:
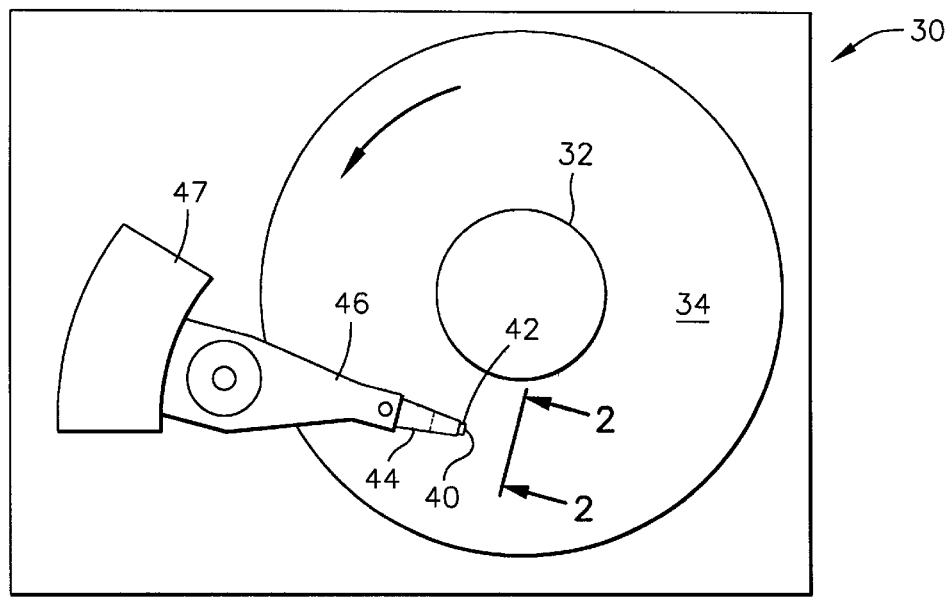
FIG. 1 is a plan view of an exemplary magnetic disk drive.
Figure 2:
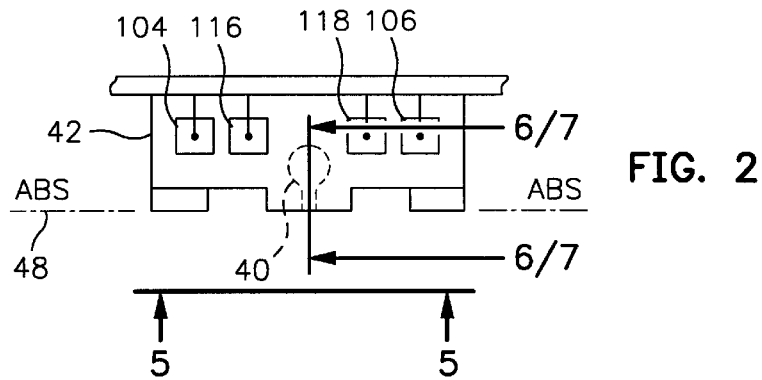
FIG. 2 is an end view of a slider with a magnetic head of the disk drive as seen in plane 2—2 of FIG. 1.
Figure 3:
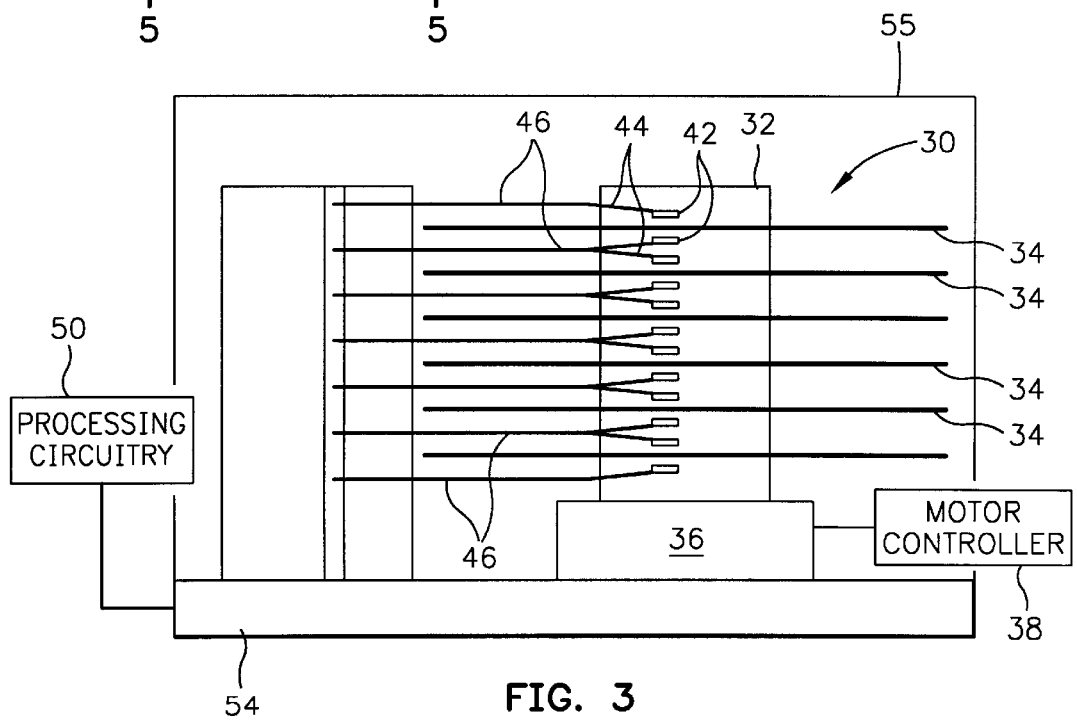
FIG. 3 is an elevation view of the magnetic disk drive wherein multiple disks and magnetic heads are employed.
Figure 4:
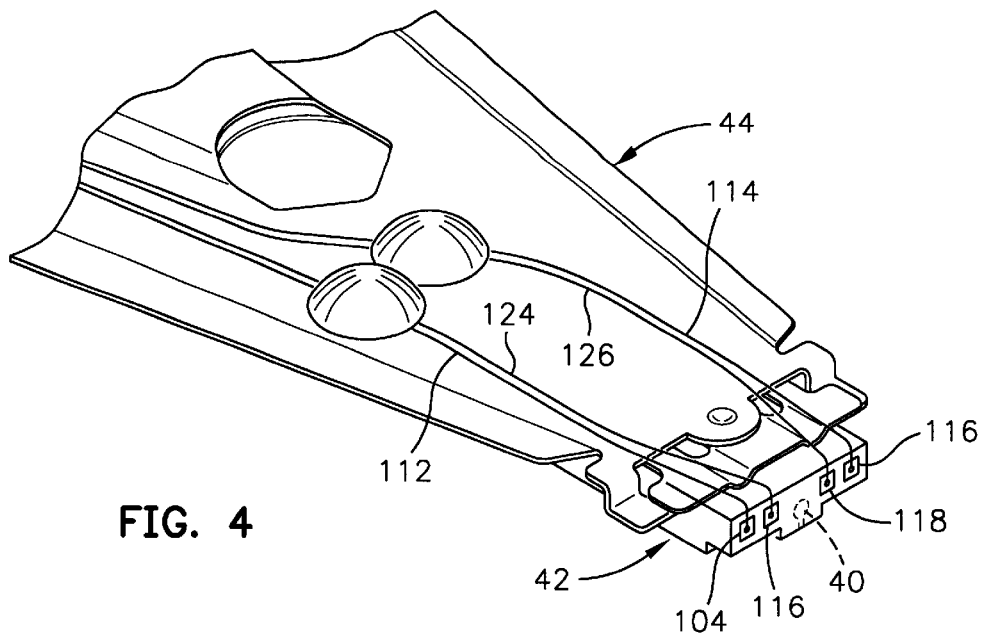
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
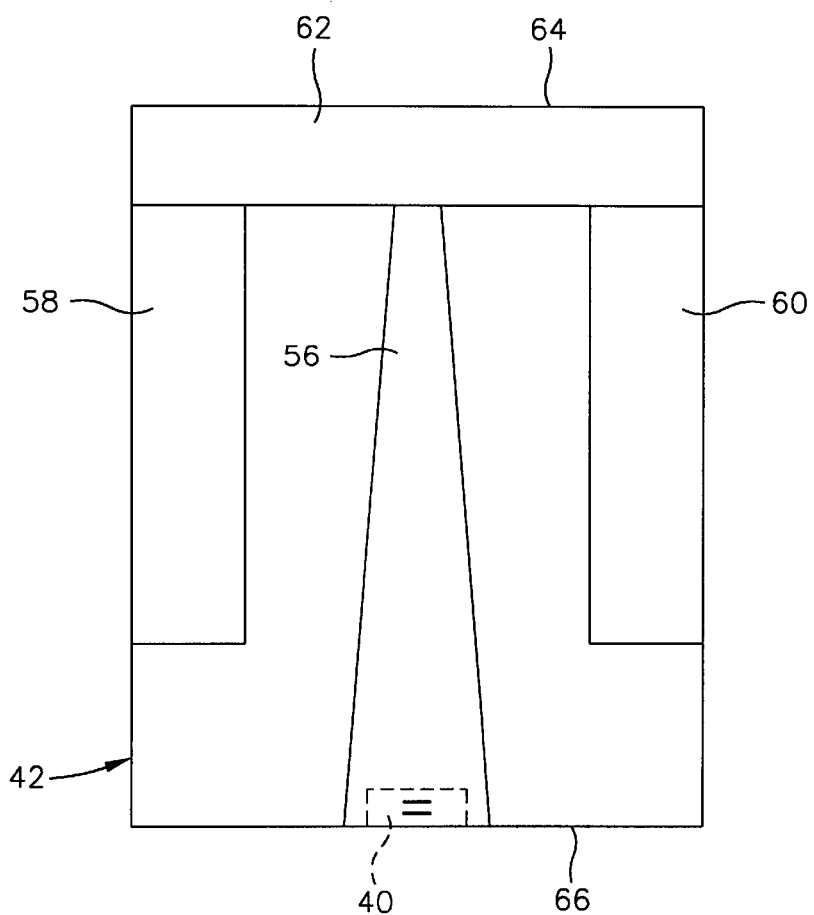
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
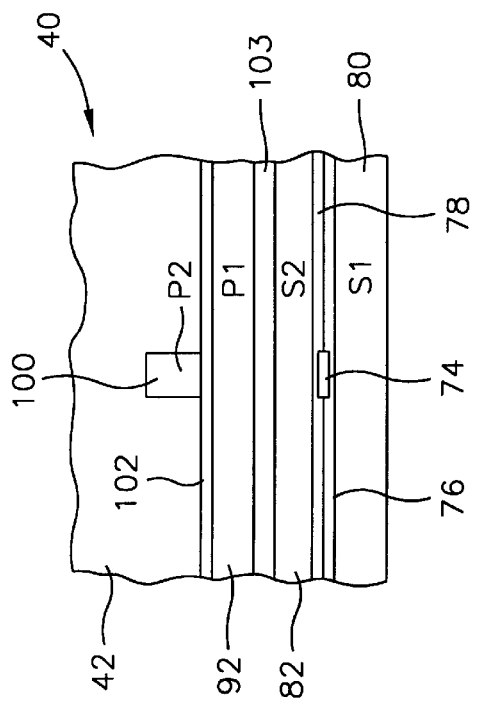
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 10:
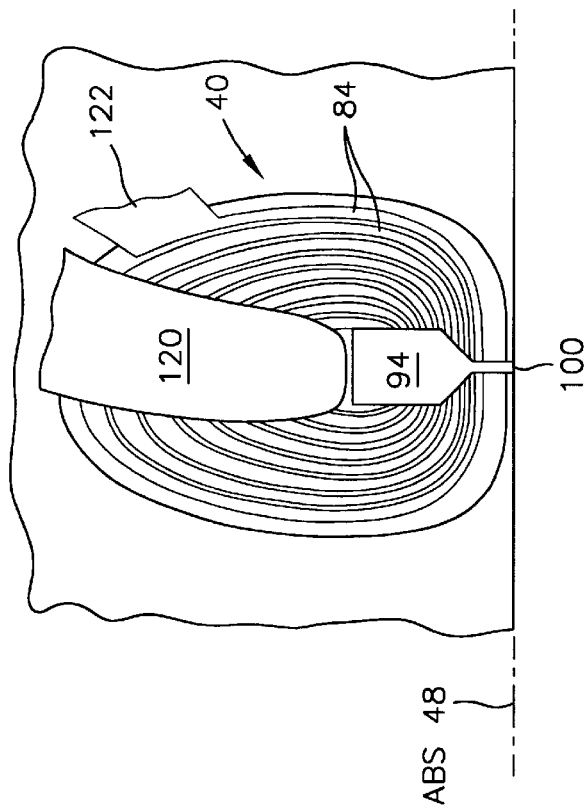
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
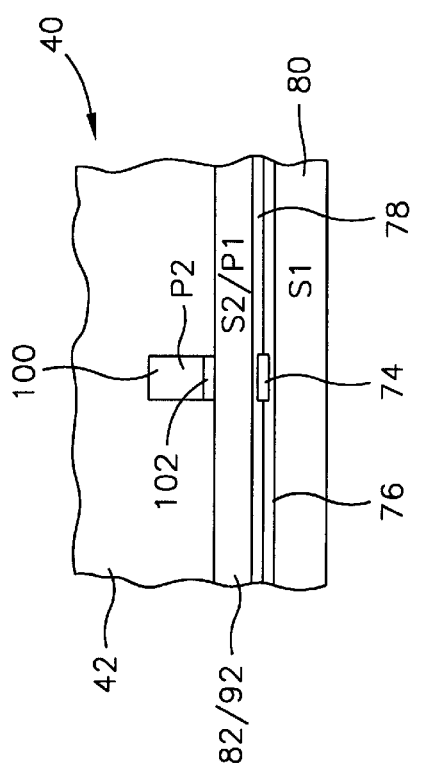
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

The Invention

Figure 11:
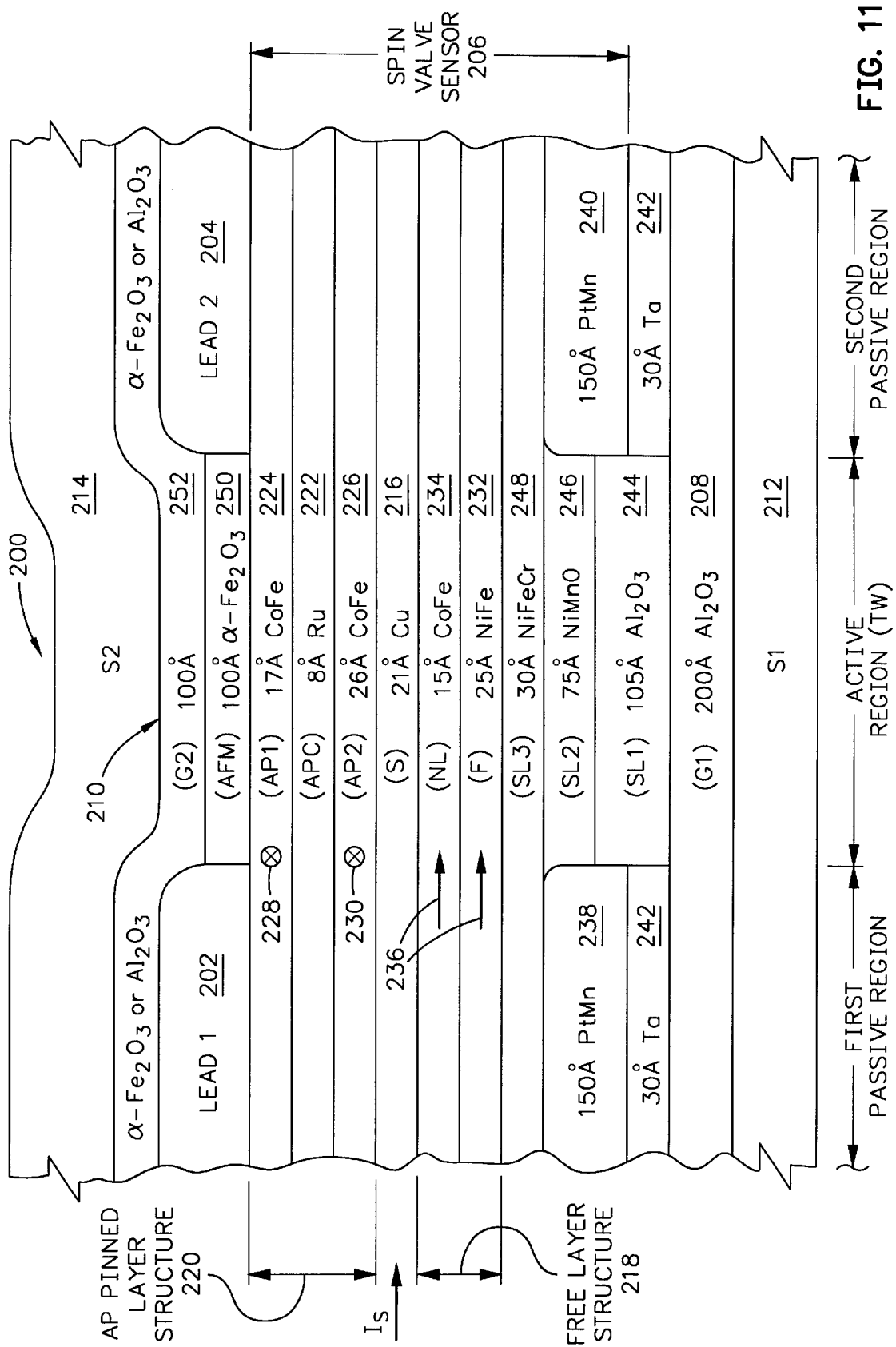
FIG. 11 is an ABS illustration of a first embodiment of the present read head.

FIG. 11 shows an ABS view of a first embodiment 200 of the present read head. The read head 200 has an active region which is located between first and second passive regions. The active region is the track width (TW) of the read head. The read head has first and second lead layers 202 and 204 which are connected to a spin valve sensor 206 in the first and second passive regions, respectively. The spin valve sensor 206 is located between first and second read gap layers (G1) and (G2) 208 and 210 and the first and second read gap layers are, in turn, located between ferromagnetic first and second shield layers (S1) and (S2) 212 and 214.

The spin valve sensor 206 includes a nonmagnetic conductive spacer layer 216 which is located between a free layer structure 218 and an AP pinned layer structure 220. The AP pinned layer structure 220 includes an antiparallel coupling layer (APC) 222 which is located between first and second AP pinned layers (AP1) and (AP2) 224 and 226. The first AP pinned layer 224 has a magnetic moment 228 which is pinned perpendicular to the ABS in either direction, such as into the sensor as shown in FIG. 11. The pinning of the magnetic moment 228 will be discussed in detail hereinafter. By strong antiparallel coupling between the first and second AP pinned layers 224 and 226 a magnetic moment 230 of the second AP pinned layer 226 is pinned antiparallel to the magnetic moment 228.

The free layer structure 218 may include a free layer (F) 232 and a nanolayer (NL) 234 wherein the nanolayer interfaces the spacer layer 216. The free layer structure 218 has a magnetic moment 236 which is parallel to the ABS in either direction, such as from left to right as shown in FIG. 11. When a signal field from the rotating magnetic disk rotates the magnetic moment 236 of the free layer into the head the magnetic moments 236 and 230 become more parallel which decreases the resistance of the spin valve sensor to the sense current $I_s$ and when a signal field rotates the magnetic moment 236 out of the head the magnetic moments 236 and 230 become more antiparallel which increases the resistance of the head to the sense current $I_s$. These increases and decreases in resistance change potentials within the sense current circuit which are processed as playback signals by the processing circuitry 50 in FIG. 3.

First and second antiferromagnetic (AFM) biasing layers 238 and 240, which are located on the first and second passive regions respectively, are employed for longitudinally biasing the free layer structure 218 so as to stabilize its magnetic domains parallel to the ABS. The preferred antiferromagnetic material is platinum manganese (PtMn). A tantalum (Ta) seed layer 242 is located between the first read gap layer 208 and each of the first and second biasing layers 238 and 240. It has been found that the tantalum (Ta) seed layers improve the biasing capability of the first and second biasing layers 238 and 240. In the active region between the first read gap layer 208 and the free layer structure 218 are located first, second and third seed layers (SL1), (SL2) and (SL3) 244, 246 and 248. The first seed layer 244 is preferably aluminum oxide ($Al_2O_3$) and the second seed layer 246 is preferably nickel manganese oxide (NiMnO). It is also preferred that the total thickness of the first and second seed layers 244 and 246 be equal to the total thickness of each of the first and second biasing layers 238 and 240 and one of the layers 242 for planarizing the spin valve sensor layers thereabove. It has been found that the first and second seed layers 244 and 246 with the compositions described improve the magnetoresistive coefficient dr/R of the spin valve sensor. The third seed layer 248, which is optional, may be nickel iron chromium (NiFeCr) for improving the interface between the first and second biasing layers 238 and 240 and the free layer structure 218 in the first and second passive regions, respectively.

Preferred thicknesses and materials for the layers are 200 Å of aluminum oxide ($Al_2O_3$) for the first gap layer 208, 30 Å of tantalum (Ta) for each of the layers 242, 150 Å of platinum manganese (PtMn) for each of the first and second biasing layers 238 and 240, 105 Å of aluminum oxide ($Al_2O_3$) for the first seed layer 244, 75 Å of nickel manganese oxide (NiMnO) for the second seed layer 246, 30 Å of nickel iron chromium (NiFeCr) for the third seed layer 248, 25 Å of nickel iron (NiFe) for the free layer 232, 15 Å of cobalt iron (CoFe) for the nanolayer 234, 21 Å of copper (Cu) for the spacer layer 216, 26 Å of cobalt iron (CoFe) for the second AP pinned layer 226, 8 Å of ruthenium (Ru) for the antiparallel coupling layer 222 and 17 Å of cobalt iron (CoFe) for the first AP pinned layer 224.

The second read gap layer 210 performs a combined function of insulating the spin valve sensor 206 and the first and second lead layers 202 and 204 from the second shield layer 214 and pinning the magnetic moment 228 of the first AP pinned layer 224. This is accomplished by providing a second read gap layer 210 which is at least partially composed of alpha ferric oxide ($\alpha Fe_2O_3$). In the embodiment shown in FIG. 11 the second read gap layer 210 comprises first and second films 250 and 252 with the first film 250 being composed of alpha ferric oxide ($\alpha Fe_2O_3$) and interfacing the first AP pinned layer 224 for pinning its magnetic moment 228. The second film 252 is preferably also composed of alpha ferric oxide ($\alpha Fe_2O_3$) so that sufficient alpha ferric oxide ($\alpha Fe_2O_3$) material is in position above the first AP pinned layer 224 for securely pinning the magnetic moment 228. Optionally, the second film 252 may be composed of aluminum oxide ($Al_2O_3$) if the first film 250 is thick enough to accomplish the pinning function. Exemplary thicknesses of the first and second films are 100 Å and 100 Å, respectively.

The mean free path of conduction electrons as the sense current $I_s$ is being conducted through sensor 206 by the first and second leads 202 and 204 is in the spacer layer 216 between the free layer structure 218 and the AP pinned layer structure 220. A percentage of these conduction electrons escape the mean free path. Those that escape upward are reflected back toward the mean free path by the alpha ferric oxide ($\alpha Fe_2O_3$) material in the second read gap layer 210. Accordingly, the second read gap layer also serves the purpose of increasing the magnetoresistive coefficient dr/R of the spin valve sensor by specular reflection of the conduction electrons.

It should be noted that the first film 250 has filled in some of the depression caused by the steps of the first and second lead layers 202 and 204. This then improves the step coverage by the second film 252 since the height of the steps has been reduced. It should also be noted that the first film 250 defines the track width (TW) of the read head. In the construction of the head the first film 250 may be formed before the first and second lead layers 202 and 204. After forming the first and second layers 202 and 204 the second film 252 may be deposited. This construction can be implemented by standard photoresist lift-off procedures. After the read head is completed a longitudinal field parallel to the ABS may be applied in the presence of heat, such as 375° C., which will orient the magnetic spins of the first and second biasing layers 238 and 240 parallel to the ABS. When the heat is reduced the magnetic spins of the first and second biasing layers 238 and 240 are set for longitudinally biasing the free layer structure 218. A field is then applied perpendicular to the ABS for setting the magnetic moment 228, as discussed hereinabove.

Figure 12:
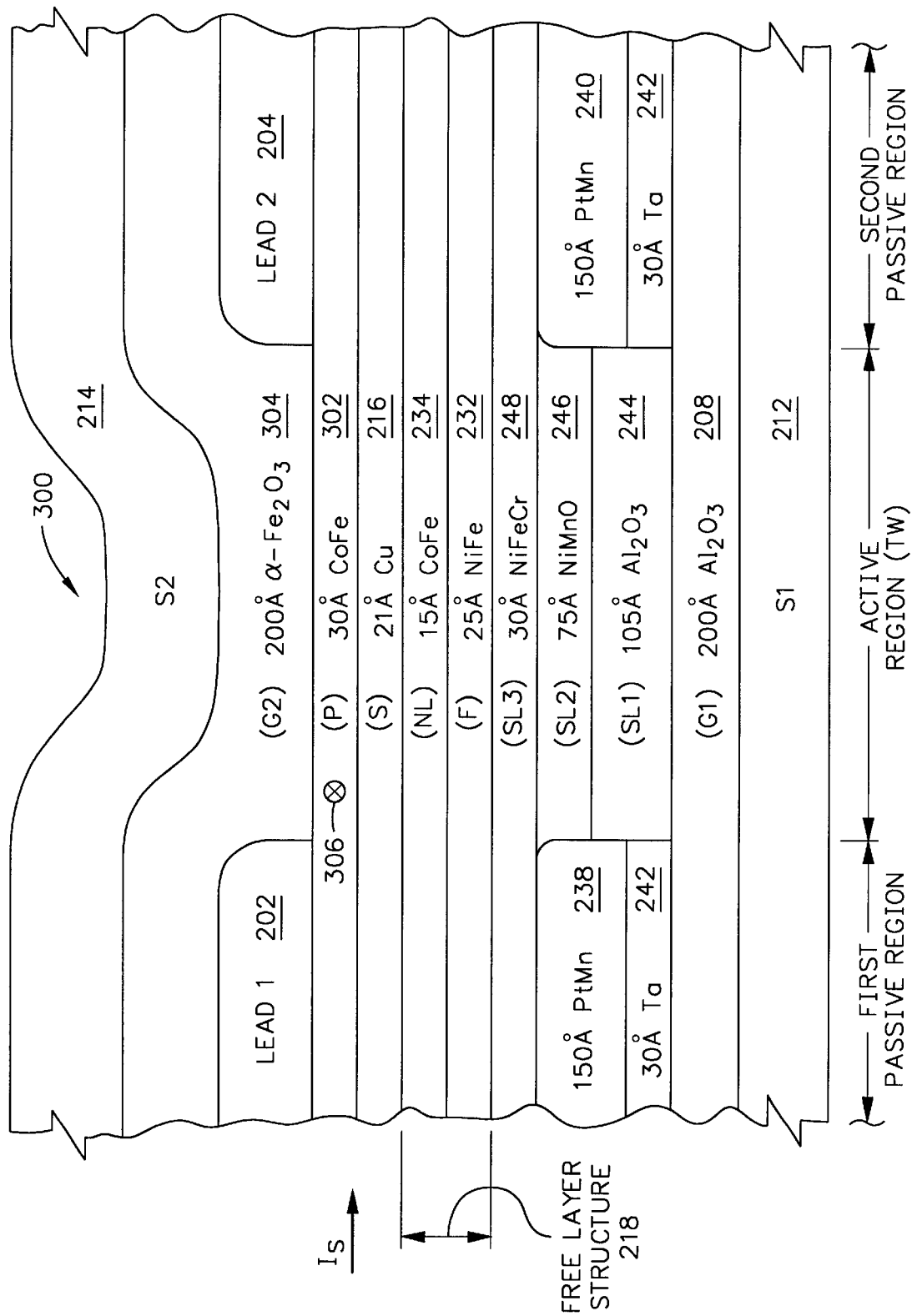
FIG. 12 is an ABS illustration of a second embodiment of the present read head.

Another embodiment 300 of the present read head is shown in FIG. 12 which is the same as the read head 200 in FIG. 11 except for a pinned layer (P) 302 and a second read gap layer 304. Instead of an AP pinned layer structure 220 in FIG. 11 a single pinned layer 302 is employed which may be 30 Å of cobalt iron (CoFe). The advantage of a single pinned layer 302 is that specular reflection by the second read gap layer 304 will be greater than that for the embodiment 200 in FIG. 11. Another advantage is that the single pinned layer 302 is thinner than the AP pinned layer structure 220 in FIG. 11 which will reduce the total read gap between the first and second shield layers 212 and 214. The AP pinned layer structure 220 in FIG. 11, however, will have a net magnetic moment which is less than the single pinned layer 302 because there is partial flux closure between the magnetic moments 228 and 230.

In the embodiment 300 the second read gap layer 304 is a single layer which is composed of alpha ferric oxide ($\alpha Fe_2O_3$). The second read gap layer 304 still defines the track width (TW) of the read head. An exemplary thickness of the second read gap layer 304 is 200 Å. In the construction of the read head the first and second lead layers 202 and 204 may be first constructed followed by deposition of the second read gap layer 304. The construction of the second read gap layer 304 is simpler than the construction of the second read gap layer 210 in FIG. 11 in that it is constructed as a single layer requiring only one deposition. The thickness of the second read gap layer 304 should be thick enough to provide a proper pinning of a magnetic moment 306 of the pinned layer and still provide adequate coverage of the steps of the first and second lead layers 202 and 204 to prevent shorting between these lead layers and the second shield layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   nonmagnetic nonconductive first and second read gap layers;
   a spin valve sensor;
   first and second lead layers connected to the spin valve sensor;
   the spin valve sensor and the first and second lead layers being located between the first and second read gap layers;
   ferromagnetic first and second shield layers;
   the first and second read gap layers being located between the first and second shield layers with the first read gap layer interfacing the first shield layer and the second read gap layer interfacing the second shield layer;
   the spin valve sensor including:
      a free layer structure that has a magnetic moment;
      a ferromagnetic pinned layer structure that has a net magnetic moment;
      a nonmagnetic conductive spacer layer located between the free layer structure and the pinned layer structure; and
      at least a portion of the second read gap layer being composed of $\alpha Fe_2O_3$ which interfaces the pinned layer structure for pinning the net magnetic moment of the pinned layer structure.

2. A magnetic read head as claimed in claim 1 wherein said at least a portion of the second read gap layer defines a track width of the read head.

3. A magnetic read head as claimed in claim 1 including:
   first and second antiferromagnetic layers exchange coupled to the free layer structure for biasing the free layer structure parallel to an air bearing surface (ABS) of the read head.

4. A magnetic read head as claimed in claim 1 wherein the pinned layer structure is an antiparallel (AP) pinned layer structure that includes:
   ferromagnetic first and second antiparallel (AP) pinned layers with the first AP pinned layer interfacing said at least a portion of the read gap layer and the second AP pinned layer interfacing the spacer layer; and
   an antiparallel (AP) coupling layer located between and interfacing the first and second AP pinned layers.

5. A magnetic read head as claimed in claim 4 including:
   first and second antiferromagnetic layers exchange coupled to the free layer structure for biasing the free layer structure parallel to an air bearing surface (ABS) of the read head.

6. A magnetic read head as claimed in claim 5 further comprising:
   the second read gap layer having first and second read gap films;
   said at least a portion of the second read gap layer being said first read gap film.

7. A magnetic read head as claimed in claim 6 wherein the first read gap film defines a track width of the read head.

8. A magnetic read head as claimed in claim 7 wherein the second read gap film is also composed of $\alpha Fe_2O_3$.

9. A magnetic read head as claimed in claim 7 wherein the second read gap film is composed of $Al_2O_3$.

10. A magnetic read head as claimed in claim 5 wherein the entire second read gap layer is composed of $\alpha Fe_2O_3$ and defines a track width of the read head.

11. A magnetic read head as claimed in claim 1 wherein the pinned layer structure is a single pinned layer.

12. A magnetic read head as claimed in claim 11 including:
   first and second antiferromagnetic layers exchange coupled to the free layer structure for biasing the free layer structure parallel to an air bearing surface (ABS) of the read head.

13. A magnetic read head as claimed in claim 12 further comprising:
   the second read gap layer having first and second read gap films;
   said at least a portion of the second read gap layer being said first read gap film.

14. A magnetic read head as claimed in claim 13 wherein the first read gap film defines a track width of the read head.

15. A magnetic read head as claimed in claim 14 wherein the second read gap film is also composed of $\alpha Fe_2O_3$.

16. A magnetic read head as claimed in claim 14 wherein the second read gap film is composed of $Al_2O_3$.

17. A magnetic read head as claimed in claim 12 wherein the entire second read gap layer is composed of $\alpha Fe_2O_3$ and defines a track width of the read head.

18. A magnetic head assembly comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      nonmagnetic nonconductive first and second read gap layers;
      a spin valve sensor;
      first and second lead layers connected to the spin valve sensor;
      the spin valve sensor and the first and second lead layers being located between the first and second read gap layers;
      ferromagnetic first and second shield layers;
      the first and second read gap layers being located between the first and second shield layers with the first read gap layer interfacing the first shield layer and the second read gap layer interfacing the second shield layer;
      the spin valve sensor including:
         a free layer structure that has a magnetic moment;
         a ferromagnetic pinned layer structure that has a net magnetic moment;
         a nonmagnetic conductive spacer layer located between the free layer structure and the pinned layer structure; and
         at least a portion of the second read gap layer being composed of $\alpha Fe_2O_3$ which interfaces the pinned layer structure for pinning the net magnetic moment of the pinned layer structure.

19. A magnetic head assembly as claimed in claim 18 wherein the first pole layer and the second shield layer are a common layer.

20. A magnetic head assembly as claimed in claim 18 including a nonmagnetic isolation layer located between the second shield layer and the first pole piece layer.

21. A magnetic head assembly as claimed in claim 18 wherein the pinned layer structure is an antiparallel (AP) pinned layer structure that includes:

ferromagnetic first and second antiparallel (AP) pinned layers with the first AP pinned layer interfacing said at least a portion of the read gap layer and the second AP pinned layer interfacing the spacer layer; and an antiparallel (AP) coupling layer located between and interfacing the first and second AP pinned layers.

22. A magnetic head assembly as claimed in claim 21 including:

first and second antiferromagnetic layers exchange coupled to the free layer structure for biasing the free layer structure parallel to an air bearing surface (ABS) of the read head.

23. A magnetic head assembly as claimed in claim 22 further comprising:

the second read gap layer having first and second read gap films;

said at least a portion of the second read gap layer being said first read gap film.

24. A magnetic head assembly as claimed in claim 23 wherein the first read gap film defines a track width of the read head.

25. A magnetic head assembly as claimed in claim 24 wherein the second read gap film is also composed of $\alpha Fe_2O_3$.

26. A magnetic head assembly as claimed in claim 24 wherein the second read gap film is composed of $Al_2O_3$.

27. A magnetic head assembly as claimed in claim 22 wherein the entire second read gap layer is composed of $\alpha Fe_2O_3$ and defines a track width of the read head.

28. A magnetic head assembly as claimed in claim 18 wherein the pinned layer structure is a single pinned layer.

29. A magnetic head assembly as claimed in claim 28 including:

first and second antiferromagnetic layers exchange coupled to the free layer structure for biasing the free layer structure parallel to an air bearing surface (ABS) of the read head.

30. A magnetic head assembly as claimed in claim 29 further comprising:

the second read gap layer having first and second read gap films;

said at least a portion of the second read gap layer being said first read gap film.

31. A magnetic head assembly as claimed in claim 30 wherein the first read gap film defines a track width of the read head.

32. A magnetic head assembly as claimed in claim 31 wherein the second read gap film is also composed of $\alpha Fe_2O_3$.

33. A magnetic head assembly as claimed in claim 31 wherein the second read gap film is composed of $Al_2O_3$.

34. A magnetic head assembly as claimed in claim 29 wherein the entire second read gap layer is composed of $\alpha Fe_2O_3$ and defines a track width of the read head.

35. A magnetic disk drive including at least one magnetic head assembly that includes a write head and a read head, the read head including a spin valve sensor, comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

nonmagnetic nonconductive first and second read gap layers;

a spin valve sensor;

first and second lead layers connected to the spin valve sensor;

the spin valve sensor and the first and second lead layers being located between the first and second read gap layers;

ferromagnetic first and second shield layers;

the first and second read gap layers being located between the first and second shield layers with the first read gap layer interfacing the first shield layer and the second read gap layer interfacing the second shield layer;

the spin valve sensor including:

a free layer structure that has a magnetic moment;

a ferromagnetic pinned layer structure that has a net magnetic moment;

a nonmagnetic conductive spacer layer located between the free layer structure and the pinned layer structure;

at least a portion of the second read gap layer being composed of $\alpha Fe_2O_3$ which interfaces the pinned layer structure for pinning the net magnetic moment of the pinned layer structure;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

36. A magnetic disk drive as claimed in claim 35 wherein the pinned layer structure is an antiparallel (AP) pinned layer structure that includes:

ferromagnetic first and second antiparallel (AP) pinned layers with the first AP pinned layer interfacing said at least a portion of the read gap layer and the second AP pinned layer interfacing the spacer layer; and an antiparallel (AP) coupling layer located between and interfacing the first and second AP pinned layers.

37. A magnetic disk drive as claimed in claim 36 including:

first and second antiferromagnetic layers exchange coupled to the free layer structure for biasing the free layer structure parallel to an air bearing surface (ABS) of the read head.

38. A magnetic disk drive as claimed in claim 37 further comprising:

the second read gap layer having first and second read gap films;

said at least a portion of the second read gap layer being said first read gap film.

39. A magnetic disk drive as claimed in claim 38 wherein the first read gap film defines a track width of the read head.

40. A magnetic disk drive as claimed in claim 39 wherein the second read gap film is also composed of $\alpha Fe_2O_3$.

41. A magnetic disk drive as claimed in claim 39 wherein the second read gap film is composed of $Al_2O_3$.

42. A magnetic disk drive as claimed in claim 35 wherein the pinned layer structure is a single pinned layer.

43. A magnetic disk drive as claimed in claim 42 including:
   first and second antiferromagnetic layers exchange coupled to the free layer structure for biasing the free layer structure parallel to an air bearing surface (ABS) of the read head.

44. A magnetic disk drive as claimed in claim 43 further comprising:
   the second read gap layer having first and second read gap films;
   said at least a portion of the second read gap layer being said first read gap film.

45. A magnetic disk drive as claimed in claim 44 wherein the first read gap film defines a track width of the read head.

46. A magnetic disk drive as claimed in claim 45 wherein the second read gap film is also composed of $\alpha Fe_2O_3$.

47. A magnetic disk drive as claimed in claim 45 wherein the second read gap film is composed of $Al_2O_3$.

48. A magnetic disk drive as claimed in claim 43 wherein the entire second read gap layer is composed of $\alpha Fe_2O_3$ and defines a track width of the read head.

49. A method of making a magnetic read head comprising:
   forming nonmagnetic nonconductive first and second read gap layers;
   forming a spin valve sensor,
   connecting first and second lead layers to the spin valve sensor with the spin valve sensor and the first and second lead layers located between the first and second read gap layers;
   forming ferromagnetic first and second shield layers with the first and second read gap layers located between the first and second shield layers with the first read gap layer interfacing the first shield layer and the second read gap layer interfacing the second shield layer;
   making the spin valve sensor comprising the steps of:
      forming a free layer structure that has a magnetic moment;
      forming a ferromagnetic pinned layer structure that has a net magnetic moment;
      forming a nonmagnetic conductive spacer layer between the free layer structure and the pinned layer structure; and
      forming at least a portion of the second read gap layer of $\alpha Fe_2O_3$ which interfaces the pinned layer structure for pinning the net magnetic moment of the pinned layer structure.

50. A method of making a magnetic read head as claimed in claim 49 wherein said at least a portion of the second read gap layer is formed to define a track width of the read head.

51. A method of making a magnetic read head as claimed in claim 49 including:
   forming first and second antiferromagnetic layers exchange coupled to the free layer structure for biasing the free layer structure parallel to an air bearing surface (ABS) of the read head.

52. A method of making a magnetic read head as claimed in claim 49 wherein the pinned layer structure is an antiparallel (AP) pinned layer structure that is made comprising the steps of:
   forming ferromagnetic first and second antiparallel (AP) pinned layers with the first AP pinned layer interfacing said at least a portion of the read gap layer and the second AP pinned layer interfacing the spacer layer; and
   forming an antiparallel (AP) coupling layer between and interfacing the first and second AP pinned layers.

53. A method of making a magnetic read head as claimed in claim 52 including:
   forming first and second antiferromagnetic layers exchange coupled to the free layer structure for biasing the free layer structure parallel to an air bearing surface (ABS) of the read head.

54. A method of making a magnetic read head as claimed in claim 53 further comprising the steps of:
   forming the second read gap layer as first and second read gap films with said at least a portion of the second read gap layer being said first read gap film.

55. A method of making a magnetic read head as claimed in claim 54 wherein the first read gap film is formed to define a track width of the read head.

56. A method of making a magnetic read head as claimed in claim 55 wherein the second read gap film is also formed of $\alpha Fe_2O_3$.

57. A method of making a magnetic read head as claimed in claim 55 wherein the second read gap film is formed of $Al_2O_3$.

58. A method of making a magnetic read head as claimed in claim 53 wherein the entire second read gap layer is formed of $\alpha Fe_2O_3$ and defines a track width of the read head.

59. A method of making a magnetic read head as claimed in claim 49 wherein the pinned layer structure is formed as a single pinned layer.

60. A method of making a magnetic read head as claimed in claim 59 including:
   forming first and second antiferromagnetic layers exchange coupled to the free layer structure for biasing the free layer structure parallel to an air bearing surface (ABS) of the read head.

61. A method of making a magnetic read head as claimed in claim 60 further comprising the steps of:
   forming the second read gap layer as first and second read gap films with said at least a portion of the second read gap layer being said first read gap film.

62. A method of making a magnetic read head as claimed in claim 61 wherein the first read gap film is formed to define a track width of the read head.

63. A method of making a magnetic read head as claimed in claim 62 wherein the second read gap film is also formed of $\alpha Fe_2O_3$.

64. A method of making a magnetic read head as claimed in claim 62 wherein the second read gap film is formed of $Al_2O_3$.

65. A method of making a magnetic read head as claimed in claim 60 wherein the entire second read gap layer is formed of $\alpha Fe_2O_3$ and defines a track width of the read head.

66. A method of making a magnetic head assembly comprising the steps of:
   making a write head including the steps of:
      forming ferromagnetic first and second pole piece layers that have a yoke portion located between a pole tip portion and a back gap portion;
      forming a nonmagnetic write gap layer between the pole tip portions of the first and second pole piece layers;
      forming an insulation stack with at least one coil layer embedded therein between the yoke portions of the first and second pole piece layers; and connecting the first and second pole piece layers at their back gap portions; and making a read head including the steps of:
  forming nonmagnetic nonconductive first and second read gap layers;
  forming a spin valve sensor;
  connecting first and second lead layers to the spin valve sensor with the spin valve sensor and the first and second lead layers located between the first and second read gap layers;
  forming ferromagnetic first and second shield layers with the first and second read gap layers located between the first and second shield layers with the first read gap layer interfacing the first shield layer and the second read gap layer interfacing the second shield layer;

making the spin valve sensor comprising the steps of:
  forming a free layer structure that has a magnetic moment;
  forming a ferromagnetic pinned layer structure that has a net magnetic moment;
  forming a nonmagnetic conductive spacer layer between the free layer structure and the pinned layer structure; and
  forming at least a portion of the second read gap layer of $\alpha Fe_2O_3$ which interfaces the pinned layer structure for pinning the net magnetic moment of the pinned layer structure.

67. A method of making a magnetic head assembly as claimed in claim 66 wherein the first pole layer and the second shield layer are formed as a common layer.

68. A method of making a magnetic head assembly as claimed in claim 66 including forming a nonmagnetic isolation layer between the second shield layer and the first pole piece layer.

69. A method of making a magnetic head assembly as claimed in claim 66 wherein the pinned layer structure is an antiparallel (AP) pinned layer structure that is made comprising the steps of:
  forming ferromagnetic first and second antiparallel (AP) pinned layers with the first AP pinned layer interfacing said at least a portion of the read gap layer and the second AP pinned layer interfacing the spacer layer; and
  forming an antiparallel (AP) coupling layer between and interfacing the first and second AP pinned layers.

70. A method of making a magnetic head assembly as claimed in claim 69 including:
  forming first and second antiferromagnetic layers exchange coupled to the free layer structure for biasing the free layer structure parallel to an air bearing surface (ABS) of the read head.

71. A method of making a magnetic head assembly as claimed in claim 70 further comprising the steps of:
  forming the second read gap layer as first and second read gap films with said at least a portion of the second read gap layer being said first read gap film.

72. A method of making a magnetic head assembly as claimed in claim 71 wherein the first read gap film is formed to define a track width of the read head.

73. A method of making a magnetic head assembly as claimed in claim 72 wherein the second read gap film is also formed of $\alpha Fe_2O_3$.

74. A method of making a magnetic head assembly as claimed in claim 72 wherein the second read gap film is formed of $Al_2O_3$.

75. A method of making a magnetic head assembly as claimed in claim 70 wherein the entire second read gap layer is formed of $\alpha Fe_2O_3$ and defines a track width of the read head.

76. A method of making a magnetic head assembly as claimed in claim 66 wherein the pinned layer structure is formed as a single pinned layer.

77. A method of making a magnetic head assembly as claimed in claim 76 including:
  forming first and second antiferromagnetic layers exchange coupled to the free layer structure for biasing the free layer structure parallel to an air bearing surface (ABS) of the read head.

78. A method of making a magnetic head assembly as claimed in claim 77 further comprising the steps of:
  forming the second read gap layer as first and second read gap films with said at least a portion of the second read gap layer being said first read gap film.

79. A method of making a magnetic head assembly as claimed in claim 78 wherein the first read gap film is formed to define a track width of the read head.

80. A method of making a magnetic head assembly as claimed in claim 79 wherein the second read gap film is also formed of $\alpha Fe_2O_3$.

81. A method of making a magnetic head assembly as claimed in claim 79 wherein the second read gap film is formed of $Al_2O_3$.

82. A method of making a magnetic head assembly as claimed in claim 77 wherein the entire second read gap layer is formed of $\alpha Fe_2O_3$ and defines a track width of the read head.

* * * * *